March 3, 1970 S. H. BOGOSIAN 3,498,201
VIGNETTING ATTACHMENT FOR PORTRAIT CAMERA
Filed June 26, 1967 2 Sheets-Sheet 1
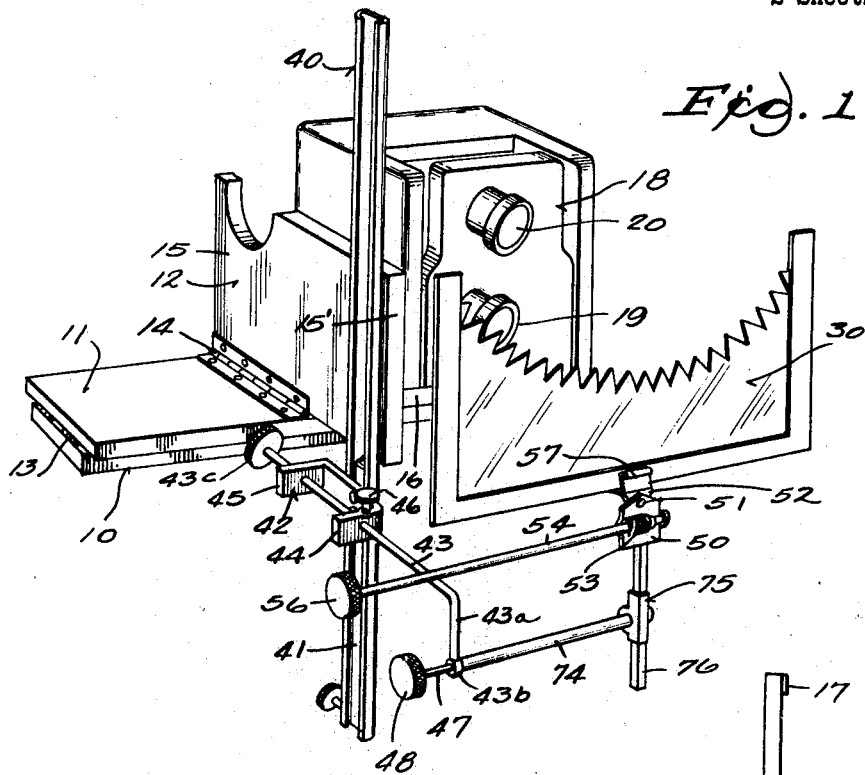
Fig. 1
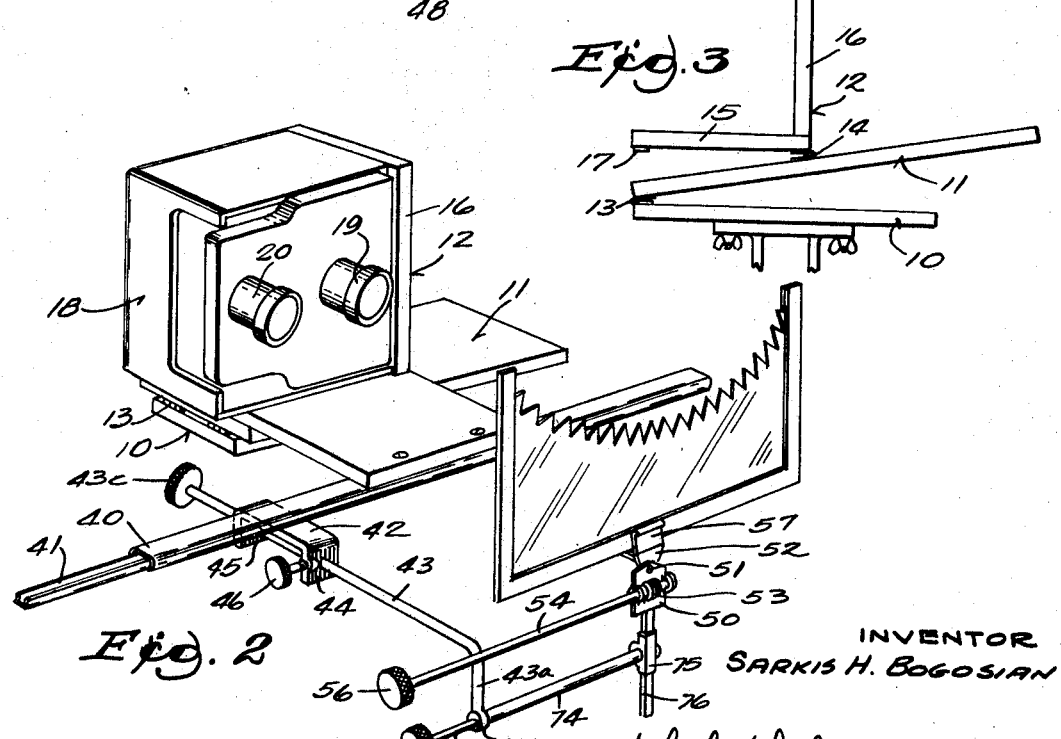
Fig. 2
Fig. 3
INVENTOR
SARKIS H. BOGOSIAN
BY Wheeler, Wheeler, House & Clemency
ATTORNEYS

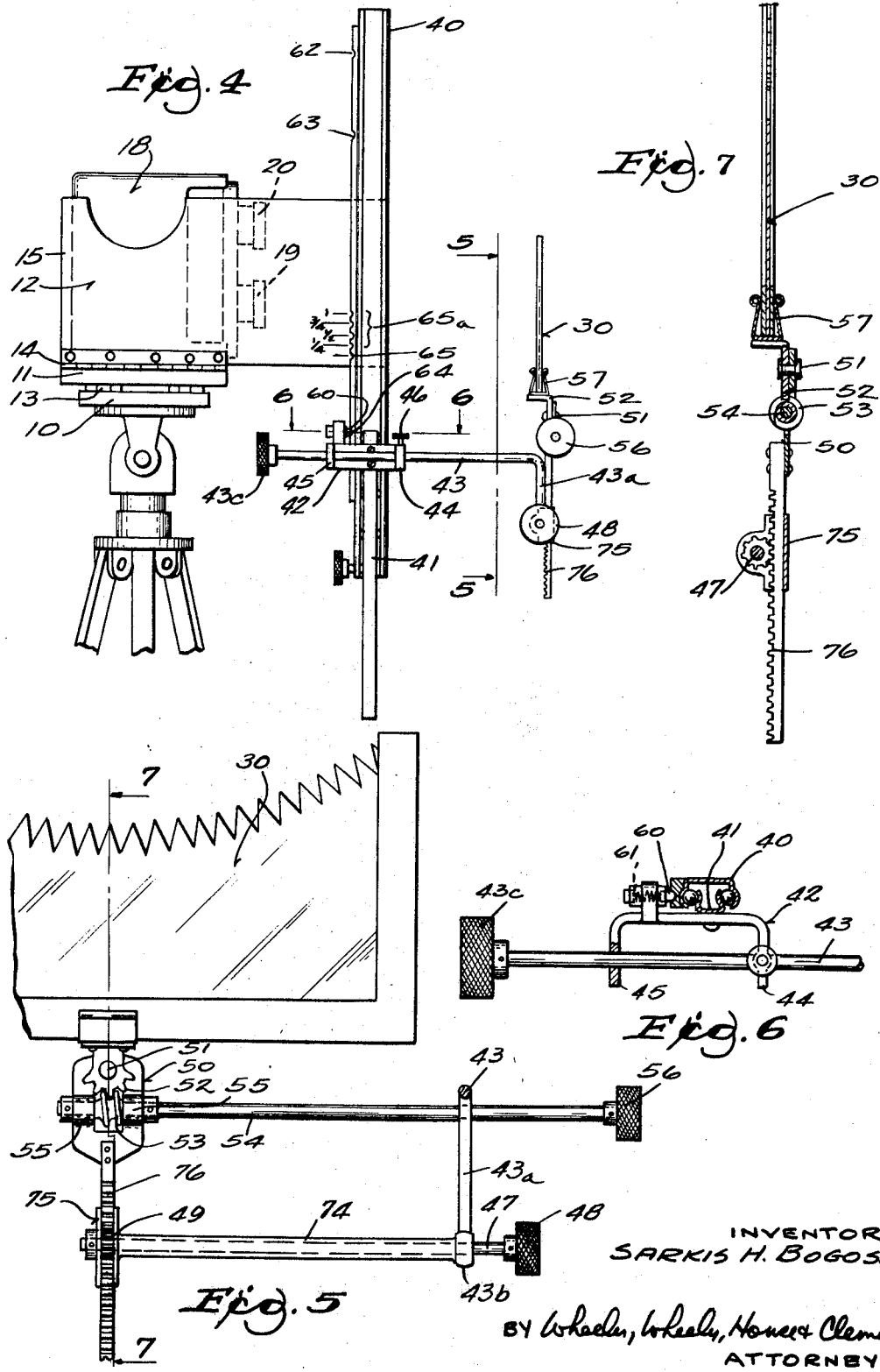

United States Patent Office 3,498,201
Patented Mar. 3, 1970

3,498,201
VIGNETTING ATTACHMENT FOR PORTRAIT CAMERA
Sarkis H. Bogosian, 1733 Rapids Drive, Racine, Wis. 53404
Filed June 26, 1967, Ser. No. 648,899
Int. Cl. G03b 11/00
U.S. Cl. 95—65                                    10 Claims

ABSTRACT OF THE DISCLOSURE

A vignetting attachment for a twin lens portrait camera which can be moved from one lens to the other without the loss of adjustment on a slide. A three part base is made up of a base platform hinged to an intermediate platform to permit tilting the camera with respect to the fixed base. A final camera supporting platform is hinged to the intermediate platform to permit the camera to be supported in a vertical, horizontal or intermediate position. The camera supporting platform of the base supports the slide on which the vignetter moves from one lens to the other. The accuracy of such movement is uneffected by the camera position. The slide is provided with stops for such movement. The vignetting screen is supported for lateral pivoting movement, vertical adjustment, forward and backward adjustment with respect to the optical axis of either lens. The controls are grouped conveniently for use by the operator from one position.

---

My invention is useful with twin lens cameras, and particularly with such cameras which are used for portrait photography. It has long been known in such photography to use a vignetting screen to mask certain portions of the image area of the picture being taken, the screen usually being so adjusted and shaped as to cause a gradual fading of picture sharpness as the eye leaves the image of the face of the subject and travels toward the margin which is masked by the vignetting screen. This may be done by using a screen with an uneven or saw-toothed edge and by placing the screen close to the camera, where the screen itself will be very much out of focus. However, in the past it has not been possible to use the vignetting screen in conjunction with the viewing lens to obtain the precise desired effect, and then accurately and very rapidly transfer the vignetting screen to the taking lens.

SUMMARY OF THE INVENTION

The invention consists of means for accurately indexing a vignetting device between a pair of positions which have the same relationship to the optical axis of the viewing lens and to the taking lens of a two-lens camera, regardless of whether the camera is vertical or horizontal and regardless of the position of adjustment of the vignetting screen itself. The invention further comprises means for adjusting the vignetting screen which are all readily accessible from a single location adjacent the station from which the camera is operated. The invention further comprises a camera cradle bearing the slide of the vignetting attachment and which is capable of supporting the camera in vertical, horizontal, and tilted positions over a wide range.

THE DRAWINGS

FIG. 1 is a perspective view of my vignetting attachment secured to a camera.
FIG. 2 is a perspective view similar to FIG. 1 showing the parts in a different position.
FIG. 3 is a rear view of the camera cradle and support lens of the device of my invention.
FIG. 4 is a side elevational view of the device of my invention.
FIG. 5 is a view on line 5—5 of FIG. 4 showing the vignetting screen and its supporting structure in a rear elevational view.
FIG. 6 is a cross sectional view on line 6—6 of FIG. 4.
FIG. 7 is a cross sectional view on line 7—7 of FIG. 5.

DESCRIPTION

As best shown in FIGURE 3, the base of my device is a camera support which is fastened to a tripod and which comprises three hinged sections 10, 11 and 12, which are connected by hinge 13 and hinge 14. Hinge 13 is at the left end of sections 10 and 11 as viewed in FIG. 3. Hinge 14 is roughly in the center of section 11 and is secured to section 12. Section 12 comprises a pair of rigidly connected flat portions 15 and 16 which are connected at right angles and which carry cushion pad 17. It is apparent from FIGURE 3 that the cradle formed by portions 15 and 16 of the base section 12 is capable of pivoting 90° with respect to leaf 11. As shown in FIG. 1 and FIG. 2, when a camera is securely mounted in the cradle formed by members 15 and 16, the camera 18 may be aligned with its taking lens 19 and its viewing lens 20 either horizontally disposed or vertically disposed with respect to each other. Moreover, by tilting the three sections 10, 11 and 12 of the base with respect to each other, for instance by inserting small wedges between them, the camera may be disposed at almost any intermediate angle as well.

It has in the past been a problem to provide a vignetting screen which is sufficiently adaptable that it can be used effectively in all of the positions in which the camera may be placed and which is capable of being moved from a position in front of the viewing lens to a position in front of the taking lens while preserving the identical relationship with the lens which was present while viewing through the viewing lens. This problem is even worse when my improved base is used, because of the wide range of possible camera orientations. I provide a vignetting screen 30 of a conventional type, but I support it in a structure which provides convenient adjustment of the vignetting screen while it is in front of the viewing lens, and instant transfer of the identical relationships to the taking lens when the picture is to be taken.

A basic part of my device is the channel 40 which is securely mounted to a forward extension 15' of flat member 15 of base section 12, as best shown in FIG. 2. A slide 41 is telescopically received within slide 40 for longitudinal movement only. Slide 41 carries a bracket 42 which is generally U-shaped and which is joined at its center section to slide 41 in such a manner that it does not restrict the longitudinal movement of slide 41 in channel 40.

A carrier bar 43 is slidably and rotatably carried in the two legs 44 and 45 of U-shaped bracket 42 and locked against movement by set screw 46, which is headed with an adjusting knob. Carrier bar 43 is turned downwardly at the end, and downwardly turned section 43a is provided with a bearing 43b at its end which is aligned with the slide 41 and the channel 40. A tube 74 is fixed to bearing 43b and extends in the same direction. Tube 74 supports a vertical adjustment bracket 75 which in turn supports a vertically extending rack 76. An adjusting rod 47 has a hand wheel 48 at the end adjacent bearing 43b and extends through bearing 43b and tube 74 to a pinion 49 on the other end.

Rack 47 carries a tilt adjusting bracket 50 which carries a pivot 51 for a sector gear 52, pivot 51 being generally parallel to the optical axis of the camera. A worm gear 53 is mounted on the end of a shaft 54 which is rotatably secured in bearings 55 on tilt bracket 50 so that when the hand wheel 56 on the end of shaft 54 is turned the worm gear 53 rotates sector gear 52 to tilt the vignetting screen 30 which is held in a clip 57 secured to the sector gear 52.

It will be noted that the hand wheel or knob 43c secured to rod 43 to control fore and aft movement of the entire device, lock knob 46 which secures shaft 43, and wheel 56 which controls tilting, and hand wheel 48 which controls the height of the vignetting screen, all are located within a short distance of each other at one side of the camera. This greatly improves the convenience of the device.

It will also be observed from FIG. 1 and FIG. 2 that the vignetting screen 30 may be placed in the same relationship to the lenses whether the camera is horizontal, vertical, or in some other orientation by adjusting rod 43 and tightening lock knob 46. Thus, for instance, the vignetting screen may be placed at the bottom of the picture even after the camera has been titled 90°.

As best shown in FIG. 4 and FIG. 6 a basic feature of my device is the plunger 60 having a rounded end, which is spring loaded by spring 61 to bear on the exterior of channel 40 where it is received in a pair of indentations 62 and 63 at one end of channel 40 for use when the camera has its lenses disposed approximately horizontally, and a second pair of indentations 64 and 65 for use when the camera is disposed with its two lenses one above the other. If desired, additional indentations to receive the spring loaded plunger 60 may be provided for any of the side positions with appropriate graduations, such as indentations 65a, which are marked to indicate the distance of these positions from positions in which the vignetting screen is in an exactly symmetrical position with respect to one lens of the camera that it was in with respect to the other lens of the camera when the plunger 60 occupied indentation 64.

The channel 40 and slide 41 are illustrated as having ball bearings in a manner similar to the suspension of a file cabinet drawer. However, any suspension which offers easy adjustment from a position in which the vignetting screen is in front of the viewing lens to a position in which the vignetting screen occupies an identical position in front of the picture taking lens is acceptable. It has been found that some kind of stop or detent such as spring loaded plunger 60 is essential to easy operation of my device in order to positively locate identical positions in front of each lens.

I claim:

1. In a twin lens camera having a pair of optical lenses with axes lying in a plane, one of said lenses being a viewing lens and the other said lens being a taking lens adapted to focus light from the subject on light-sensitive material, and a vignetting screen adapted to selectively mask portions of the light from the subject from portions of the image area the improvement comprising a support for said vignetting screen movable from a first position having a relationship to the optical axis of the viewing lens such that a desired portion of the light from the subject is blocked therefrom to a second position having an identical relationship to the optical axis of the taking lens whereby the same portion of the light from the subject is blocked from that lens, and means to stop the vignetting screen support means at each of said positions when it is moved from the other of said positions.

2. The device of claim 1 in which the vignetting screen support means comprises a channel mounted in a fixed position with respect to the camera, a bracket having means adapted to support a vignetting screen, said bracket being slidably mounted with respect to the channel.

3. The device of claim 1 in which the means for moving the vignetting screen from one position to the other is fixedly secured to a base, said camera also being mounted on said base, a pair of additional bases underlying the base to which the camera is fixed, said base to which the camera is fixed being hinged to the center of the uppermost of said pair of underlying bases, the pair of underlying bases being hinged to each other at one end.

4. The device of claim 1 in which the support means for the vignetting screen includes a clip for holding the screen, means for tilting said clip about an axis generally parallel with the optical axes of the lenses of the camera and for securing said clip in said tilted position, means for raising and lowering said clip and for securing said clip in its adjusted vertical positions, and means for moving said clip forward and back with respect to said lenses and for securing said clip in its adjusted fore and aft position.

5. The device of claim 4 in which the means for adjusting the clip fore and aft with respect to the optical lenses of the camera comprises a rod passing through a pair of spaced bearings one of which bearings is provided with a lock screw adapted to secure the rod fixedly in said bearing, whereby the same rod may be turned to displace the vignetting screen 90° with respect to the optical axis of the camera lens and adjusted in its displaced position.

6. In a twin lensed camera provided with a vignetting screen, the improvement comprising a channel mounted in front of the camera and parallel to a line between said twin lenses, a slide secured to the channel and mounted for movement therealong, a bracket secured to said slide, a rod supported in said bracket for rotative and longitudinal movement, locking means adapted to secure said rod in its adjusted position with respect to said bracket, means for holding said vignetting screen, said means for holding said vignetting screen being mounted on said rod, means adapted to adjust the height of said means supporting said vignetting screen with respect to said rod, and means adapted to tilt said means for holding said vignetting screen with respect to said rod, and means fixing a pair of defined positions of said slide with respect to said channel, said positions bearing identical relationships to the respective lenses of said twin lens camera.

7. The device of claim 6 further including a pair of flat bases for said camera hinged together at one end, a third base hinged to the center of one of said pair of bases and fixedly secured to said camera, said third base being the means by which said channel is supported in front of said camera.

8. The device of claim 7 in which the adjustment for tilting the vignetting lens support means is a worm gear and sector gear.

9. The device of claim 6 in which the means for vertically adjusting the position of the vignetting screen support means is a rack and pinion.

10. The device of claim 9 in which all of the controls for positioning said vignetting screen are mounted at one side of the camera regardless of the position of the camera and of the vignetting screen.

References Cited

UNITED STATES PATENTS

| | | | |
|---|---|---|---|
| 413,611 | 10/1889 | Clark | 95—65 |
| 1,197,811 | 9/1916 | Folmer | 95—65 |
| 2,003,754 | 6/1935 | Miller | 95—18 |

JOHN M. HORAN, Primary Examiner

LEO H. McCORMICK, Jr., Assistant Examiner

PO-1050
(5/69)

UNITED STATES PATENT OFFICE
CERTIFICATE OF CORRECTION

Patent No. 3,498,201          Dated March 3, 1970

Inventor(s) Sarkis H. Bogosian

It is certified that error appears in the above-identified patent and that said Letters Patent are hereby corrected as shown below:

Column 1, Line 31,    "lens" should read ---lensed---

Column 2, Line 68,    "Rack 47" should read ---Rack 76---

SIGNED AND
SEALED
AUG 4 - 1970

(SEAL)
Attest:

Edward M. Fletcher, Jr.
Attesting Officer

WILLIAM E. SCHUYLER, JR.
Commissioner of Patents